United States Patent
Farris et al.

[11] Patent Number: 6,038,227
[45] Date of Patent: Mar. 14, 2000

[54] PRESELECTION OF SERVICE PROVIDER AND FUNCTIONALITY

[75] Inventors: Robert D. Farris, Sterling, Va.; Stephen J. Flaherty, Upper Marlboro, Md.

[73] Assignee: Bell Atlantic Network Services, Inc., Arlington, Va.

[21] Appl. No.: 08/816,228

[22] Filed: Mar. 12, 1997

[51] Int. Cl.⁷ .......................... H04L 12/66; H04L 12/28; H04M 3/42; H04M 7/00

[52] U.S. Cl. .......................... 370/354; 370/404; 379/207; 379/219

[58] Field of Search .................................... 370/220, 352, 370/354, 355, 401, 395, 397; 379/112, 113, 207, 127, 221, 93.17, 220, 225

[56] References Cited

U.S. PATENT DOCUMENTS

| | | | |
|---|---|---|---|
| 5,200,993 | 4/1993 | Wheeler et al. | 379/93.02 |
| 5,247,347 | 9/1993 | Litteral et al. | 348/7 |
| 5,247,571 | 9/1993 | Kay et al. | 379/207 |
| 5,377,186 | 12/1994 | Wagner et al. | 370/220 |
| 5,422,943 | 6/1995 | Cooney et al. | 379/225 |
| 5,544,164 | 8/1996 | Baran | 370/397 |
| 5,572,583 | 11/1996 | Wheeler, Jr. et al. | 379/207 |
| 5,583,863 | 12/1996 | Darr, Jr. et al. | 370/397 |
| 5,608,786 | 3/1997 | Gordon | 370/352 |
| 5,724,355 | 3/1998 | Bruno et al. | 370/401 |
| 5,726,984 | 3/1998 | Kubler et al. | 370/349 |
| 5,757,894 | 5/1998 | Kay et al. | 379/127 |
| 5,771,279 | 6/1998 | Cheston, III et al. | 379/93.17 |
| 5,774,530 | 6/1998 | Montgomery et al. | 379/112 |
| 5,809,120 | 9/1998 | Montgomery et al. | 379/113 |
| 5,854,835 | 12/1998 | Montgomery et al. | 379/113 |
| 5,881,145 | 3/1999 | Giuhat et al. | 379/207 |
| 5,903,639 | 5/1999 | Lipchock et al. | 379/220 |

*Primary Examiner*—Hassan Kizou
*Assistant Examiner*—John Pezzlo
*Attorney, Agent, or Firm*—McDermott, Will & Emery

[57] ABSTRACT

A system and method for interposing in the feeder system of a switched telecommunications network an adjunct programmable program controlled switching system providing preselection of service providers and the functionalities provided. The adjunct switching system is preferably enclosed in a controlled environment vault existing in the feeder system of the telecommunications network and housing optical to electrical interfaces. The system and method provide for by-passing the end office switches in the telecommunications network to connect subscribers to various services such as competitor local exchange networks, LANs, interexchange carrier points of presence, the Internet, packet data networks, wireless communication systems, traffic operator position stations, video services, and the like. The adjunct switching system provides both wideband and narrowband switching.

31 Claims, 2 Drawing Sheets

PRESELECTION OF SERVICE PROVIDER AND FUNCTIONALITY

FIELD OF THE INVENTION

This invention relates to telecommunications networks and more particularly to a system and method of enhancing the traffic handling capacity and performance of such networks by implementing a preselection of service provider and functionality for performing the service.

BACKGROUND

There is presently in progress an exponential growth in the variety of new communication technologies and functionalities which are being developed and currently presented for public use. The implementation of such technologies has in one way or another resulted in highly increased demands upon the facilities of the public switched telephone network (PSTN). While many of these technologies have been publicized as virtual substitutes for the PSTN, the fact is that their implementation has increased the usage of all or parts of the networks which are operated by local exchange carriers or LECs. This phenomena threatens not only to degrade the quality of performance of the local PSTN but also to produce potentially serious network overload to the detriment of virtually all network services. The problems which have been caused or imminently threatened pose difficult questions by their very variety and unforeseen nature.

By way of example: Recent legislative and regulatory changes require that a local exchange carrier (LEC) unbundle certain network elements and services and offer use of those elements and services to other carriers for resale to end users. In one required implementation, the LEC will sell the other carrier an unbundled port on an end office switch and allow the other carrier to become a competing local exchange carrier (CLEC) by reselling services of the switch to end users having local loops which connect to the end office switch.

Those statutory and regulatory changes also specify that the enhanced service known as customized routing be made available for both unbundled switching and for resale. Customized routing is the term used in the regulations for routing calls made in the local exchange carrier (LEC) switch to locations other than those that exist today. The primary applications are for unbundlers and resellers to have operator (0+, 0−) calls and directory assistance calls (411/555) routed to their own platforms. Other types of calls could possibly be applicable as well, but the 0+/0−/411 calls are the ones in most immediate demand.

This type of customized routing in an interconnection environment represents a capability that currently does not exist in the network architecture of LECs. The currently used switches in the LEC public switched telephone networks were not designed with this functionality in mind. The capability does not exist and the switches are not readily adaptable to provide customized routing. This applies to all of the predominantly deployed switches (5ESS, 1AESS, EWSD, and DMS-100) from three major switch manufacturers, Lucent Technologies (formerly AT&T), Nortel, and Siemens.

One prospective unbundler and reseller has suggested use of line class codes (LCCs) to accomplish this purpose. However, any implementation of customized routing using LCCs would require use of an excessive number of such codes and would produce other serious problems. Not only is there a limit to the capacity of the switch regarding the number of LCCs that could be physically provisioned, managing the new operational environment is at least as critical. The provisioning and maintenance systems that support the LEC's services cannot be ignored. These systems allow telephone services to be ordered, provisioned, monitored, repaired, and billed; they are an essential element in contributing to the quality of service enjoyed today by the public LEC's customers.

Without incorporating new LCCs into the operations systems that support services, severe problems would have to be expected in provisioning services. Manual provisioning would require human intervention and complex lookups that involve locating the correct code in a table of thousands. Such a process would be prone to both error and delay resulting in service degradation. It is for this reason that today's process is mechanized. In an environment with considerably more codes, a mechanized process would be even more important.

The line class code approach would use existing switch resources in a manner that was never intended. Such an application is untested and to some degree would have unknown consequences if deployed on any meaningful scale. Even the proponent of this approach has indicated that LCCs would be an interim and limited workaround which would need to be reversed once a longer term solution could be developed.

Another proposal for coping with the problem has been the possible use of an Advanced Intelligent Network (AIN) common channel signaling (CCS) solution. However, this is not feasible in view of the fact that, while the AT&T 1AESS switch has AIN capability, it will not apply AIN type processing to 0 calls. In that switch, the 0 number routing functionality takes precedence over all other types of call processing, including AIN processing.

As another example, it is common knowledge that usage of the computer network known as the Internet has increased tremendously. Internet Service Providers (ISPs) such as America On Line and Compuserve are connected to the Internet via high speed lines, such as T1/T3 and the like, and generally do not have their own Internet based Autonomous Systems but have or use dial-up networks connected to the PSTN. Personal computers (PCs) and Laptop computers are representative of computers connected to the Internet via the public switched telephone network (PSTN) and ISPs via dial up links.

Aggressive competition by regional ISPs has recently induced a number of the larger national ISPs to offer flat-rate pricing coupled with intensive advertising. This has been received with enthusiasm with the result that leading systems are frequently overloaded. More and more users are buying computers which are sufficiently powerful to send video and photographs, which constitute data-intensive material that can clog lines. In addition, more and more companies are using the Internet to conduct their business, communicate with and support their customers, exchange electronic mail with hundreds of thousands of users, seek and find valuable information. The most common forms of the overload are twofold. Customers frequently encounter busy signals due to lack of ISP contracted line capacity following the dialing of a hunt-group type directory number. This produces a complete inability for the customer to connect to the ISP.

As another example of a new type of traffic to be handled by the PSTN of LECs reference is had to U.S. Pat. No. 5,200,993, issued Apr. 6, 1993 to Wheeler et al., entitled Public Telephone Network Including a Distributed Imaging System. That patent describes a PSTN having enhanced capabilities with a distributed imaging system. The imaging system interfaces with end users through appropriate bridges, routers and gateways to provide the user with a virtual local area network. Automatic number information (ANI) is used to automatically configure the system as required by the user.

As a still further example of new uses for the PSTN, U.S. Pat. No. 5,247,347, issued Sep. 21, 1993 to Litteral et al., entitled PSTN Architecture for Video-on-Demand Services, describes the use of a PSTN to provide digital video signals from a video information provider to one or more of a plurality of subscriber premises. A subscriber uses either a standard telephone instrument over the PSTN or a dedicated control device over an ISDN packet network to order video programming. Connectivity between a central office and subscriber is provided by asymmetrical digital subscriber line interface units over the telephone local loop. The interface units frequency multiplex digital video information with voice information to the subscriber and support transmission of a reverse control channel from the subscriber to the central office for transmission on the ISDN packet data network back to the video information provider. The interfaces also allow base band signaling and audio between the central office and the subscriber for conventional telephone instrument connectivity.

U.S. Pat. No. 5,583,863, issued Dec. 10, 1996 to Darr, Jr., entitled Full Service Network Using Asynchronous Transfer Mode Multiplexing, describes an arrangement for transporting digital broadband data output in Asynchronous Transfer Mode (ATM) cell streams from a plurality of video information service providers (VIPs) to a plurality of subscribers.

In addition to the foregoing it has become commonplace to use so called Intelligent Peripheral (IP) platforms to provide a variety of services to subscribers through the central office switch with repetitive iterations between the switch or service switching point (SSP), service transfer point (STP), and integrated service control point (ISCP), and between the ISCP and the IP. Thus while the IP adds functionality to the service it nevertheless requires both voice and signaling traffic with the switching system in the central office. An example of such an arrangement is found in U.S. Pat. No. 5,572,583, issued Nov. 5, 1996 to Wheeler, Jr. Et al., entitled Advanced Intelligent Network with Intelligent Peripherals Interfaced to the Integrated Services Control Point. That patent describes an intelligent peripheral platform used in the advanced intelligent network (AIN). The IP assumes some functions presently performed by the ISCP and central office switches. Among its functional capabilities are voice announcement, digit collection, speech recognition and an array of other enhanced call processing features, such as voice or facsimile messaging.

Still further proposals for use of the facilities of the PSTN involve the provision of long distance telephone service via the Internet. This service loads not only the voice circuits but also the common channel signaling network.

All of the foregoing entail increased traffic, increased signaling, and increased connection time delays. When it is considered that current dial-up usage of the Internet through ISPs now includes day long sessions it will be appreciated that serious public network overload is predictable if not already existing.

OBJECTS OF THE INVENTION

It is a primary object of the invention to prevent and avoid the above described problems.

It is another object of the invention to prevent and avoid such problems by providing a PSTN network architecture and methodology which will significantly divert load from the central office switching systems.

It is yet another object of the invention to provide an improved PSTN capable of providing efficient transport and delivery of a wide range of different types of signaling without overload of the existing plant.

It is another object of the invention to provide such a PSTN which offers preselection of service provider and of a selected functionality.

SUMMARY OF THE INVENTION

The distribution network in the typical local exchange telephone system is that part which connects the switched and interoffice networks with individual customers. The distribution network includes the feeder and the distribution plants. The feeder portion of the network is composed of fiber-optic cable or fiber, various gauges of copper cables, T1-carrier lines, and wireless connectivity or radio. It can transport analog and digital signals that are multiplexed together to achieve high bit rates, which characterize the modern feeder network. Analog-to-digital conversion is achieved through Digital Loop Carrier (DLC) systems, which are the first step in the multiplexing process. Both the DLC and multiplexer systems are strategically placed in proximity to the Feeder Distribution Interface (FDI).

The feeder routes provide large numbers of cable pairs or channels from the central office to strategic remote locations called serving area interfaces or interfaces. These interfaces are cross-connect points in the network between the feeder plant and the distribution plant or FDI.

Fiber transmission facilities are being increasingly introduced in the feeder plant. About three-quarters of all new fiber installation projects are now in the feeder plant. Loop electronics is utilized to provide interconnection between the fiber and the cable pairs to the customer premises. As loop electronics has entered the distribution network, equipment enclosures have become more widespread. These enclosures are designed to house repeaters, remote terminals and other loop electronic equipment. They may or may not have a controlled environment to regulate temperature and humidity. Prefabricated or custom-built huts and housings are used in remote areas while the underground Controlled Environmental Vault (CEV) is utilized in congested areas.

According to the invention a switching platform is provided in the CEV in front of the central office (CO) or end office (EO) to make decisions ahead of the switching system in that office and thereby relieve traffic load on the end office or EO. The switching system has signaling point (SP) or service switching point (SSP) common channel interoffice signaling (CCIS) capability and is connected to a service transfer point (STP) in the LEC network CCIS system. Switches of the type desired for this service are available commercially in modularized form requiring very limited space and at a very significantly lower cost than central office switching equipment. The switching platform is preferably integrated with an Intelligent Peripheral (IP) platform. With this arrangement a multitude of different functionalities are provided to relieve traffic through the PSTN end office. This is best illustrated by a brief description of examples.

If a subscriber connected to the CEV in front of the end office or EO via a cable pair desires to make a call using a CLEC company, he goes off-hook. The CEV switching system sees the subscriber go off-hook but need not and does not provide a dial tone. The subscriber is contractually dedicated to the CLEC and this information is stored in the database of the IP. The IP and switch thus know that the subscriber who went off-hook is a CLEC subscriber and this determination is made ahead of the end office switch and not behind it. With this information the CEV switch simply performs a tandem switching function and connects the subscriber to the CLEC end office. The LEC end office switch (which is in the PSTN) is relieved of this function and the traffic, signaling load, and delay which it entails.

The CEV switch is traffic loaded so that a one-to-one installation is not needed between the CLEC company and the subscribers served from the CEV. If the subscriber desires access to both the CLEC company and the LEC in the PSTN, the program in the CEV switch and IP may be established so that the caller simply dials "*" or some other pre-set character to signify a desire to use the LEC service. Otherwise, when the caller picks up the phone it draws dial tone from the CLEC. Thus the caller is provided with an election of carriers and reaches the CLEC without a preliminary call or connection to the LEC end office switch.

In another instance a subscriber may desire video services. With the arrangement of the invention he simply turns on the television set and thereby accesses the IP in the CEV. The switch in the CEV knows that the request requires a broadband connection based on the nature and size of the facility of the subscriber. The switch preferably offers so-called split switch functionality and connects the caller to the appropriate video module to connect to the video network.

As a still further example, a subscriber may desire access to the Internet, a notoriously growing source of end office switch overload in the PSTN. Again the subscriber is provided with a connection of pre-arranged bandwidth through interaction of the CEV switch and IP and its accessory modules. The subscriber may simply use his telephone terminal to key a predetermined DTMF tone and be switched directly to the appropriate interface module. Alternately, the computer itself may generate the necessary signal to effect the connection. The PSTN end office switch may be completely by-passed while accessing the high bandwidth of the fiber connection available in the CEV. The possibility of reaching the Internet in this manner and providing a conduit of wide bandwidth offers significant benefits in the face of the long duration Internet connections that only recently have begun to occur.

Yet another advantage of the invention is its ability to provide Microwave Multi-point Distribution System (MMDS) signal delivery. MMDS furnishes a wireless microwave distribution of cable or other provider furnished television or TV service. This type service by LECs has been previously stated to have the capability to provide one hundred service channels to a radius of approximately forty miles from the transmitter. Pursuant to the invention the CEV may be provided with the antenna and the signal distributed from there to the various subscriber premises. The final cable pairs need only extend from the CEV to the subscribers premises rather than all the way to the end office. Again the end office switch is relieved of traffic load.

A still further service which is facilitated by the invention is access to packet telephony without dial tone from or traffic through the end office switch. Such packet telephony may be implemented not only through the Internet but through other packet networks such as the common channel signaling network. An example of the latter type communication is provided in the common assignee's copending and allowed application Ser. No. 08/353,281, attorney docket number 680-085, filed Dec. 5, 1994, entitled Voice Mail Communication with Call Blocking.

Yet another feature of the invention is the possibility of providing mediation which reduces the load on the end office switch. By way of example, in the CLEC situation the CEV with its IP can provide selective use of the common channel signaling network in the LEC to ascertain whether a connected subscriber line is available, regardless of whether the subscriber is connected to the line and trunk network of the LEC or the CLEC, and regardless of the service to which the customer subscribes. Such an arrangement permits the LEC to utilize the common channel signaling network for this type of mediation without requiring a complete interconnection of common channel signaling systems of the LEC and CLEC. It will be appreciated that this is a very desirable feature in order to exclude from the LEC common channel signaling network an uncontrolled signaling traffic emanating from the CLEC network. A further arrangement made feasible by the system of the invention is for the LEC to provide controlled common channel signaling from CEV to CEV for a CLEC which lacks such a system.

It is to be noted that the switching system installed in the CEV constitutes a through-put device. It does not provide dial tone and does not itself provide service. The switch simply effects connection of the subscriber to the instrumentality necessary to reach his ultimate destination. It is provided with the intelligence to ascertain the intermediate device necessary to connect the subscriber to the desired destination and can provide the connection to that intermediate device. In a sense it might be thought of as a tandem/IP. It permits by-passing the end office for widely varying services such as broadband (including TV), packet, MMDS, satellite, long distance, and various types of CLEC connection. The CEV is provided with the ability to act as a pre-selection device with engineered loading. For example, there may be 200 CLEC subscribers handled, but there may be a necessity for only 50 lines to the CLEC.

The arrangement also will permit by-passing long distance service around the end office switch so that it originates in the CEV.

In view of the fact that the ultimate connection of the end office is via very low loss fiber, it is possible that certain end offices may be eliminated entirely. Thus an existing end office may be bypassed by connecting the fiber that presently terminates in that end office to another end office and/or tandem switch, either directly or via another CEV. This would be feasible because the end office to which re-connection will be made has had its traffic load reduced by equipping it with a similar CEV preselection installation.

Voice dialing is subject to implementation for both the LEC and the CLEC in advance of the end office switch. A subscriber to LEC voice dialing can go off-hook and by voice command reach the CLEC or the LEC end office without any voice to digit translation at or through the end office switch. The translation from voice to command or digits occurs in the CEV.

DETAILED DESCRIPTION

Figure 1:
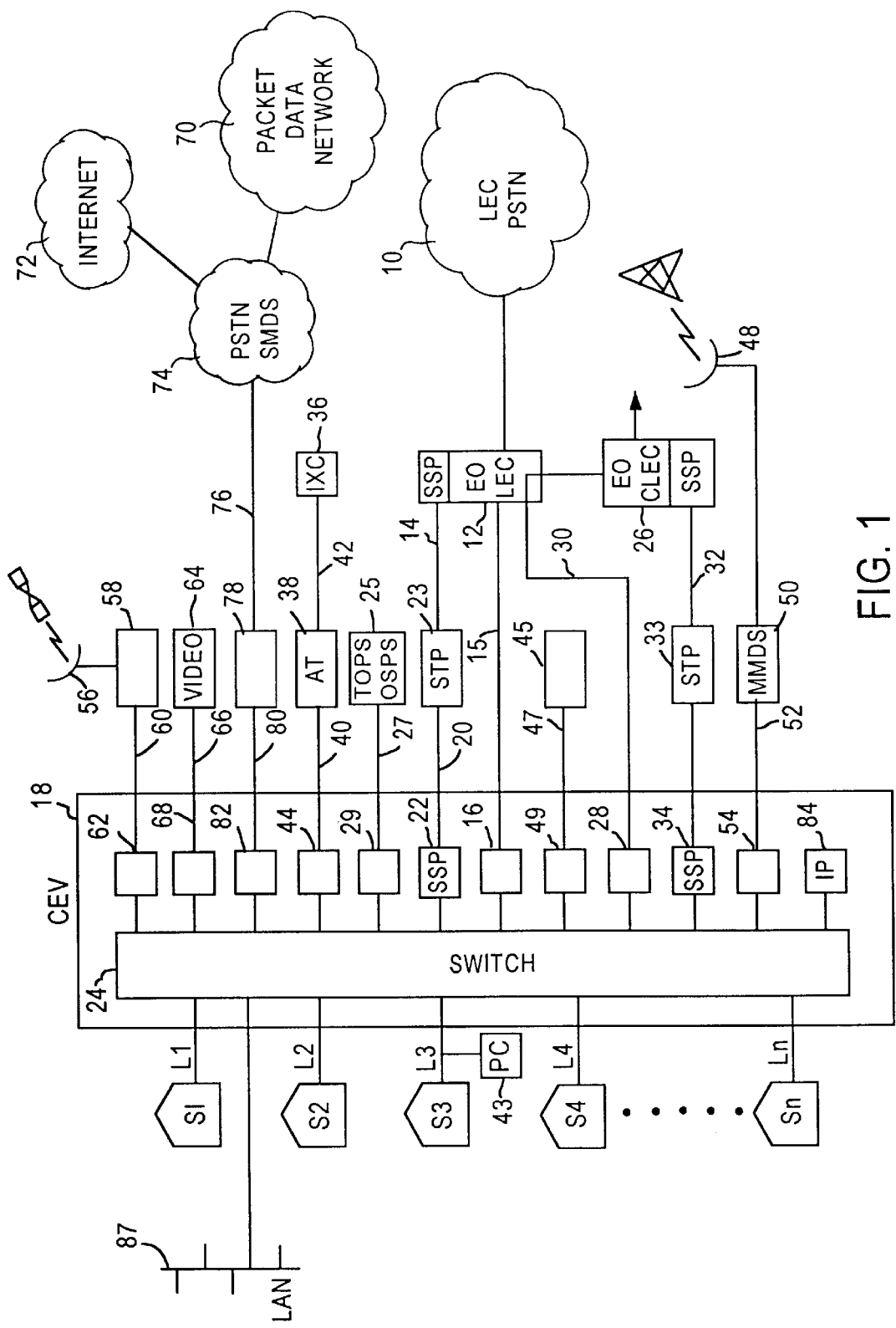
FIG. 1 is a simplified block diagram illustration of a preferred embodiment of a public switched telephone network incorporating the invention.

Referring to FIG. 1 there is shown in the cloud 10 a representation of a local exchange carrier or LEC which is a part of the public switched telephone network or PSTN. The LEC provides connectivity to subscribers S1 through Sn through an end office switch 12. The end office or EO/LEC switch connects through a fiber feeder 15 to a fiber to copper terminating module or unit 16 in a controlled environment vault or CEV 18. The end office switch 12 is SSP capable and connected to the LEC common channel interoffice signaling (CCIS) system (not shown) in the LEC/PSTN cloud 10. A CCIS data link 14, 20 connects the SSP associated with the end office switch 12 to an SSP terminating module 22 in the CEV 18 via an STP 23. The fiber terminating modules in the CEV are connected to a program controlled switching system 24 which is described in further detail hereinafter. The switch is connected to the served subscribers S1–Sn by local loops L1–Ln.

The end office 26 of a competitor exchange carrier or CLEC is connected through the LEC end office to a feeder link shown for convenience at an interface module 28 in the CEV 18 by a feeder link 30 which may or may not be fiber. The terminating module 28 is in turn connected to the switch 24 from which it is connectable to any CLEC subscribers in the subscriber group S1–Sn. In this instance the CLEC end office is SSP equipped and connected by data link 32 and STP 33 to an SSP terminating module 34 to the switch 24. The CLEC end office 26 is connected direct to the CLEC network, not shown.

The connection of the CLEC end office switching system to the feeder link 30 is made in the LEC end office but does not go through the LEC end office switching system. The CLEC is provided with a feeder link by the LEC pursuant to unbundling requirements. While the feeder link 30 is shown as a separate link in FIG. 1 this is for ease of description only. The LEC feeder link 15 is a fiber link with high capacity and the link provided to the CLEC may be carried as one of the multiplexed optical signals in that link. In such an event the CLEC feeder link would be connected to the same terminating module 16 by the LEC fiber link 15. Demultiplexing occurs in the terminating module in a conventional fashion.

In the event that the CLEC subscriber has also subscribed to the LEC service and retains the option to choose local exchange carriers on a call by call basis, the necessary switching occurs in the CEV and not in the LEC end office switching system, as is described in further detail hereinafter.

A traffic operator position system (TOPS) or operator services position system (OSPS) 25 is connected to the CEV by a feeder link 27. The link 27 connects to a link terminating module 29 and from there to the switch 24.

An interexchange carrier network (IXC) 36 is connected through an access tandem (AT) and links 40 and 42 to a terminating module 44 in the CEV 18. Ordinarily the links 40 and 42 would be fiber. The terminating module 44 is connected to the switch 24.

Television signals may be provided to the subscribers S1–Sn by a Microwave Multi-point Distribution System (MMDS) from a transmitting antenna 48 to an MMDS receiver 50, fiber feeder link 52, and fiber terminating module 54. It will be understood that while most of the local loops L1–Ln will be copper twisted pair, such links may comprise coaxial cable or fiber. The terminating module 54 is connected to the switch 24.

Television or other broadband or narrow band service may also be provided to the subscribers S1–Sn by satellite through a satellite antenna 56, satellite receiver 58, feeder link 60, and terminating module 62 connected to the switch 24. While the MMDS receiver 50 and satellite receiver 58 are shown as external to the CEV it is also contemplated that these units may be housed in the CEV with the antennae mounted on or in close proximity to the CEV.

Television and other related multi-media interactive services may also be provided to the subscribers S1–Sn through networks such as those shown in U.S. Pat. No. 5,247,347, issued Sep. 21, 1993 to Litteral et al., entitled PSTN Architecture for Video-on-Demand Services, shown here illustratively at 64. The network 64 may be connected by feeder link 66 to a terminating module 68 and thence to the switch 24. Other such imaging services may be similarly connected, such as, by way of example, the Distributed Imaging System described in U.S. Pat. No. 5,200,993, issued Apr. 6, 1993 to Wheeler et al., referenced hereinabove. Such a system is shown diagrammatically at 45 connected by a feeder 47 to an interface 49 connected to the switch 24.

Connection is provided to the public data network and to the Internet, shown at 70 and 72, respectively, via the PSTN switched multi-megabit data service (SMDS) network 74. This network is connected by fiber feeder 76 to a modem pool module 78 and fiber feeder 80 to the CEV 18. At the CEV the feeder is connected to a terminating module 82 to the switch 24.

The switch installation is provided with an Intelligent Peripheral (IP) shown at 84. The IP may be of the type shown by way of example in U.S. Pat. No. 5,572,583 issued to David F. Wheeler, Jr. and Robert D. Farris Nov. 5, 1996, entitled Advanced Intelligent Network with Intelligent Peripherals Interfaced to the Integrated Services Control Point. That patent is incorporated herein by reference in its entirety.

In addition to the subscribers S1–Sn, the switch 24 may also serve one or more local area networks or LANs shown at 86. The local loop serving the LAN may comprise fiber, coaxial cable or twisted pair.

Figure 2:
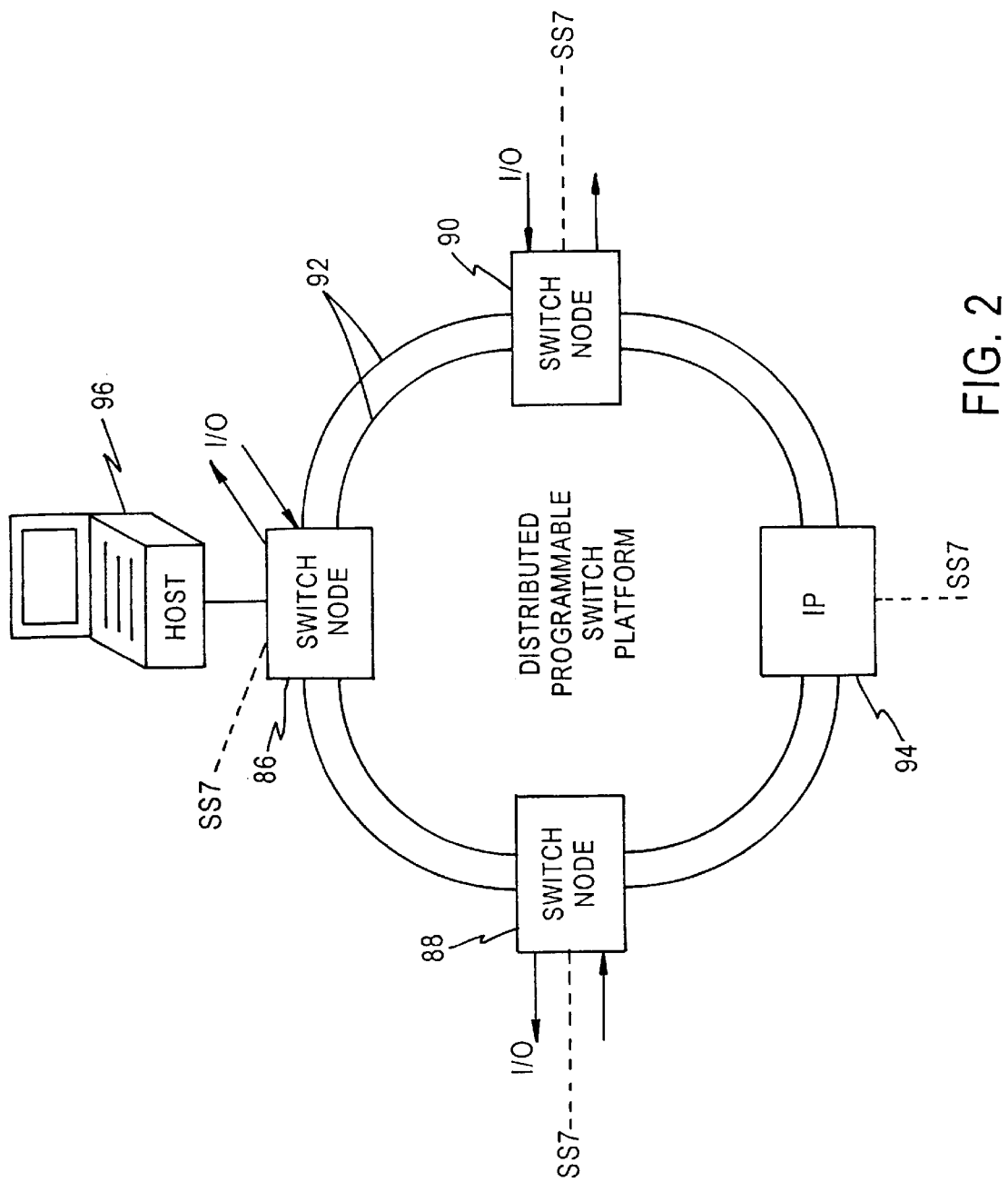
FIG. 2 is a more detailed diagram of the switching system utilized in the system of FIG. 1 according to a preferred embodiment of the invention.

Referring to FIG. 2 there is shown a diagrammatic representation of a preferred embodiment of switch for use in the architecture of FIG. 1. The switching platform shown in FIG. 2 represents an expandable switching system that provides a host controlled, distributed programmable switching environment. Modular programmable switching platforms or nodes 86, 88, and 90 may be linked together with an IP platform 94 by a high by a high speed, (1.2 Gbps), high bandwidth, dual, counter-rotating fiber optic ring network 92 using a packet-based protocol. Each node is configured with a controller card which interfaces to the ring network. A host 96 provides a client/server mode of operation for all nodes in the platform.

All resources in the distributed environment have access to all ports in the system. There are intermixed switching, signaling and telecommunications resources with direct connection among voice processing resources. The arrangement provides direct access to expandable switching bandwidth. The open architecture supports the integration of various service resources with the switching resources on the network providing switch bandwidth for both narrow and broadband processing resources and other applications on demand. These may include virtual private networks, advanced intelligent networks (AIN), wireless services, distributed call center applications, distributed voice processing applications, television distribution applications and the like. Fully redundant configurations may be utilized. The switching system may be functionally visualized as a form of split switch. The principal elements are a hypothetical broadband switch fabric and a narrowband switch fabric.

Each switch fabric respectively receives either broadband or narrowband information from a plurality of interface modules. Each of the interface modules receives broadband data from an external broadband network, narrowband data from trunk circuits, or narrowband data over telephone lines. The interface modules can also output information from either of the respective broadband or narrowband switch fabrics. An example of such a switching system which is commercially available is the EXS System offered by Excel, Inc. of Hyannis, Mass.

Suitable switch nodes may be provided, by way of example, by Excel LNX and PCX non-blocking programmable switches. Such switches provide fault tolerant switching in a compact microprocessor design. Each switch node comprises a multi-slot chassis having a configurable combination of line and service cards, and a host interface. The unit supports common channel signaling packet engines for both ISDN and SS7 communications. Line protocol cards include E1, T1, and J1 services.

SS7 connectivity for the switching system may be provided by an SS7 card in one or more of the switching nodes. The card allows the switch node, controlled by the host, to act as a signaling point (SP), service switching point (SSP), or as an Intelligent Peripheral (IP) to an SSP in the SS7 network architecture.

Typical operation of the system is now described.

A subscriber at premises S4, who has subscribed to the services of the CLEC 26, may make a call using the CLEC 26 by simply going off-hook. The CEV switch 24 sees the subscriber go off-hook and queries the database of the IP 84. The database shows that the customer at S4 is dedicated to the CLEC 26. With this information the CEV switch 24 simply performs a tandem switching function and connects the subscriber to the CLEC end office 26. The LEC end office switch 12 is thereby relieved of any traffic or signaling function in handling the CLEC call. The CEV switch and IP have performed a mediation and preselection function and acted to simply make the connection between the caller and functional module needed for the caller to reach the ultimate destination.

If the subscriber desires access to both the CLEC company and the LEC in the PSTN, the program in the CEV switch and IP may be set up so that he simply dials "*" or some other pre-set character. When this occurs the caller is connected to the end office of the LEC to complete the call.

If the CLEC subscriber at S4 needs operator assistance and dials 411, he may obtain that assistance direct from the CLEC if the CLEC has contracted to provide such a service. However, it may be that the CLEC has no operator assistance facilities but has contracted with the LEC to provide the service. In the latter event the dialing of 411 by the CLEC subscriber at S4 will trigger the CEV switch 24 to query the database in the IP. Upon making such an inquiry the switch will determine that the CLEC has contracted for LEC operator assistance. The CEV switch will then connect the calling party to the TOPS/OSPS position 25. Again the call has been completed without imposing load on the LEC end office switch.

Another possibility is that the CLEC has no common channel signaling network but has contracted with the LEC to provide that type of service. In that event the CEV switch platform will be so programmed as to use the CCIS network of the LEC to determine the availability of the called party and so signal the calling CLEC end office. Such service avoids burdening the LEC end office switch and also avoids giving the CLEC complete access to the CCIS system of the LEC.

A further service which may be offered by the LEC to the CLEC is the convenience of voice dialing. The IP in the CEV switch platform provides voice recognition facilities and voice dialing. By arrangement with the LEC the CLEC may have the LEC direct voice dialed calls to its IP for translation to DTMF digits and deliver these to the CLEC end office switch. Thus the CLEC is provided with voice dialing without requiring voice to digit translation via the LEC end office switch and the IP with which it may be associated. The same is true for voice dialed calls which are to be handled by the LEC. The voice to digit translation may be handled by the IP in the CEV.

In the case of a long distance call by a LEC subscriber, the dialing of the long distance prefix causes the CEV switch and/or the IP to make a determination as to the designated interexchange carrier. The call is then connected through the CEV switch 24 to the IXC point-of-presence (POP) at the tandem 38 and thence to the IXC network indicated at 36.

In the instance where the subscriber has a television service, he may simply turn on the television set and thereby access the IP in the CEV. The switch in the CEV knows that the request requires a broadband connection based on the nature of the facility of the subscriber. The switch offers split switch functionality and connects the subscriber to the appropriate video module to connect to the video network. This may be the interface module 62 to the satellite service, the module 68 to the full service network 64, or the module 54 to the MMDS service.

Where the subscriber seeks connection to the Internet he is provided with a connection of pre-arranged bandwidth through interaction of the CEV switch and IP and its accessory modules. The subscriber may simply use his telephone terminal to key a predetermined DTMF tone and be switched directly to the interface module 82 and modem pool 78 to the SMDS network 74. The SMDS network provides direct connectivity into the Internet. Alternately, a computer such as the PC 43 at subscriber premises S3 may be used to generate the necessary signal to effect the connection. The PSTN end office switch may be completely by-passed while accessing the high bandwidth of the fiber connection available in the CEV. The possibility of reaching the Internet in this manner and providing a conduit of wide bandwidth offers significant benefits in the face of the long duration Internet connections that presently being encountered. This means of access offers the further advantage that it provides connectivity simply to a port on the switch. The switch offers wideband capability and can connect directly to the SMDS network by using port or node addressing to replace the telephone number access that is now required. This in itself is significantly advantageous in view of the current shortage of telephone numbers. The subscriber may reach the packet data network in similar fashion.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A switched communications network, comprising:

an exchange carrier network comprising trunked together central office switching systems providing telephone service for subscriber stations;

a common channel interoffice signaling system, comprising at least one signal transfer point and data links connecting the at least one signal transfer point to a plurality of the central office switching systems;

a remote multi-subscriber interface installed between one of the central office switching systems serving as an end office and subscriber premises served by the end office;

a first feeder link coupled between the end office and the multi-subscriber interface;

a plurality of individual subscriber links extending from the multi-subscriber interface to a plurality of the subscriber premises; and a second feeder link coupled between the multi-subscriber interface and an alternate service node separate from the central office switching systems;

the multi-subscriber interface comprising:

(a) subscriber terminals, each of said subscriber terminals connecting to one of the subscriber links;

(b) a program controlled switching system coupled to the subscriber terminals and to the feeder links, wherein the program controlled switching system selectively provides communication connections of each of a plurality of the subscriber terminals to the first feeder link and to the second feeder link; and (c) a signaling interface coupled to the program controlled switching system and connected to a data link to the signal transfer point of the common channel interoffice signaling system.

2. A switched communications network as in claim 1, wherein the multi-subscriber interface further comprises an interface enclosure enclosing the subscriber terminals, the program controlled switching system and the signaling interface.

3. A switched communications network as in claim 1, wherein:

the trunked together central office switching systems comprise central offices of a first exchange carrier network, and the second feeder link provides communications to and from a second exchange carrier telephone network.

4. A switched communications network as in claim 3, wherein the first exchange carrier network is a local exchange carrier network, and the second exchange carrier telephone network is a competing local exchange carrier network.

5. A switched communications network as in claim 3, wherein the first exchange carrier network is a local exchange carrier network, and the second exchange carrier telephone network is an interexchange carrier network.

6. A switched communications network as in claim 3, further comprising another signaling interface coupled to the program controlled switching system and connected to a data link of a common channel interoffice signaling system of the second exchange carrier telephone network.

7. A switched communications network as in claim 1, wherein the second feeder link comprises a broadband link to a digital broadband switch serving as the alternate service node.

8. A switched communications network as in claim 1, wherein the second feeder link comprises a wireless communication system.

9. A switched communications network as in claim 1, wherein the second feeder link comprises a digital data communication link to a packet switch serving as the alternate service node.

10. A switched communications network as in claim 9, wherein the second feeder link carries Internet access traffic.

11. A switched communications network as in claim 1, wherein the program controlled switching system comprises a multinode distributed system linked by a broadband local area network.

12. A switched communications network as in claim 11, wherein the first feeder link comprises an optical fiber link, and a node of the multinode distributed system comprises an optical to electrical interface connected to the optical fiber link.

13. A switched communication network as in claim 11, wherein the broadband local area network comprises an optical fiber ring.

14. A switched communications network as in claim 1, wherein the multi-subscriber interface further comprises an intelligent platform coupled to the program controlled switching system, the intelligent platform containing a database of information for use in controlling selective connections for each subscriber premises provided by the program controlled switching system.

15. A switched communication network as in claim 1, wherein the communication connections to the second feeder link enable communications without processing through any of the central office switching systems of the exchange carrier network.

16. A switched communications network, comprising:

an exchange carrier network comprising trunked together central office switching systems providing telephone service for subscriber stations;

a multi-subscriber interface installed between one of the central office switching systems serving as an end office and subscriber premises served by the end office;

a first feeder link coupled between the end office and the multi-subscriber interface;

a plurality of individual subscriber links extending from the multi-subscriber interface to a plurality of the subscriber premises served by the end office; and a plurality of second feeder links coupled between the multi-subscriber interface and respective alternate service nodes separate from the central office switching systems of the exchange carrier network;

the multi-subscriber interface comprising:

(a) subscriber terminals, each of said subscriber terminals connecting to one of the individual subscriber links;

(b) couplings to the feeder links; and (c) a program controlled switching system connected to the subscriber terminals and to the couplings to the feeder links, the program controlled switching system selectively providing communication connections of each of a plurality of the subscriber terminals to the first feeder link and to each of the second feeder links.

17. A switched communications network as in claim 16, wherein the multi-subscriber interface further comprises an interface enclosure enclosing the subscriber terminals, the couplings to the feeder links and the program controlled switching system.

18. A switched communications network as in claim 16, wherein the multi-subscriber interface further comprises an intelligent platform coupled to the program controlled switching system, the intelligent platform containing a database of information for use in controlling selective connections for each subscriber premises provided by the program controlled switching system.

19. A switched communications network as in claim 16, wherein the program controlled switching system comprises a multinode distributed system linked by a broadband local area network.

20. A switched communications network as in claim 19, wherein
the first feeder link comprises an optical fiber link, and
a node of the multinode distributed system comprises an optical to electrical interface connected to the optical fiber link.

21. A switched communications network as in claim 19, wherein the broadband local area network comprises an optical fiber ring.

22. A switched communications network as in claim 16, wherein the first feeder link comprises an optical fiber link.

23. A switched communications network as in claim 16, wherein each of the second feeder links comprises a link to a node of an alternate service network selected from the group consisting of: a broadband digital network, a wireless network, another exchange carrier network, a data network, and an Internet service provider network.

24. A switched communication network as in claim 16, wherein the communication connections to the second feeder links enable communications without processing through any of the central office switching systems of the exchange carrier network.

25. A remote switching system for use in a feeder system of an exchange carrier network, the remote switching system comprising:
a plurality of programmable switch modules;
a fiber optic ring interconnecting the programmable switch modules; and
a host server coupled to one of the programmable switch modules, for controlling operations of the remote switching system;
at least one of the switching modules comprising a feeder port connection for a feeder to a central office switching system of the exchange carrier network;
at least one of the switching modules comprising a feeder port connection for a feeder to an alternate service node independent of the central office switching system;
at least one of the switching modules comprising subscriber terminals, for connection to a plurality of links to respective subscriber premises;
wherein programming of the host server controls operations of the programmable switch modules enabling the switching system to provide selective communication connections of each of a plurality of the subscriber terminals to the feeder port connections.

26. A switching system as in claim 25, wherein the feeder port connections provide telephone communications.

27. A switching system as in claim 25, wherein one of the feeder port connections provides narrowband communications, one of the feeder port connections provides broadband communications, and the switching system provides narrowband and broadband switching services.

28. A switching system as in claim 25, wherein at least one of the switching modules further comprises a port for a data link of a common channel interoffice signaling network.

29. A method for selectively providing connections to a telephone exchange carrier network and off-loading data traffic from the telephone exchange carrier network, comprising:
coupling a program controlled switching system between a plurality of links to subscriber premises and first and second feeders, the first feeder going to an end office switch of the telephone exchange carrier network, and the second feeder going to a data system for servicing data traffic without going through the end office switch;
sensing a request for telephone service for one of the links to subscriber premises;
in response to the request for telephone service, providing a switched communication for the one subscriber link through the program controlled switching system and the first feeder to the end office switch, and providing telephone service via the end office switch;
sensing a request for data communications service from any one of the links to subscriber premises; and
using control data stored in association with the program controlled switching system, providing switched communication for said any one subscriber link through the program controlled switching system to the second feeder instead of the first feeder, in response to the request for data service.

30. A method as in claim 29, wherein the data system coupled to second feeder comprises a node of an internet service provider network.

31. A method as in claim 29, wherein the data system coupled to the second feeder provides a broadband service.

* * * * *